United States Patent
Buehler et al.

(10) Patent No.: US 7,280,673 B2
(45) Date of Patent: Oct. 9, 2007

(54) SYSTEM AND METHOD FOR SEARCHING FOR CHANGES IN SURVEILLANCE VIDEO

(75) Inventors: Christopher J. Buehler, Cambridge, MA (US); Matthew A. Gruenke, Clinton, MA (US); Neil Brock, Acton, MA (US)

(73) Assignee: Intellivid Corporation, Cambridge, MA (US)

( * ) Notice: Subject to any disclaimer, the term of this patent is extended or adjusted under 35 U.S.C. 154(b) by 782 days.

(21) Appl. No.: 10/683,562

(22) Filed: Oct. 10, 2003

(65) Prior Publication Data

US 2005/0078853 A1    Apr. 14, 2005

(51) Int. Cl.
*G06K 9/00*    (2006.01)

(52) U.S. Cl. .................. 382/103; 382/224; 382/305

(58) Field of Classification Search ........... 382/103, 382/107, 173, 218, 224, 236; 348/152, 154, 348/155, 700
See application file for complete search history.

(56) References Cited

U.S. PATENT DOCUMENTS

| | | | |
|---|---|---|---|
| 3,740,466 A | 6/1973 | Marshall et al. | 178/6.8 |
| 4,511,886 A | 4/1985 | Rodriguez | 340/534 |
| 4,737,847 A | 4/1988 | Araki et al. | 358/108 |
| 5,097,328 A | 3/1992 | Boyette | 358/108 |
| 5,164,827 A | 11/1992 | Paff | 358/108 |
| 5,179,441 A | 1/1993 | Anderson et al. | 358/88 |
| 5,216,502 A | 6/1993 | Katz | 358/108 |
| 5,237,408 A | 8/1993 | Blum et al. | 358/108 |
| 5,243,418 A | 9/1993 | Kuno et al. | 358/108 |
| 5,298,697 A | 3/1994 | Suzuki et al. | 187/131 |
| 5,305,390 A | 4/1994 | Frey et al. | 382/2 |
| 5,317,394 A | 5/1994 | Hale et al. | 348/208 |
| 5,581,625 A | 12/1996 | Connell | 382/1 |
| 5,666,157 A | 9/1997 | Aviv | 348/152 |
| 5,699,444 A | 12/1997 | Palm | 382/106 |
| 5,706,367 A * | 1/1998 | Kondo | 382/236 |
| 5,729,471 A | 3/1998 | Jain et al. | 364/514 |

(Continued)

FOREIGN PATENT DOCUMENTS

EP    0 529 317 A1    3/1993

(Continued)

OTHER PUBLICATIONS

Gupte, et al "Detection and Classification of Vehicles", pp. 37-47, 2002.*

(Continued)

*Primary Examiner*—Daniel Mariam
(74) *Attorney, Agent, or Firm*—Goodwin Procter LLP

(57) ABSTRACT

Systems and methods for determining when a change has occurred in an area-of-interest included in an image region are disclosed. The system and methods may perform a specially modified background subtraction method. The systems and methods may initialize a background image region and then comparing a first image region from a second frame to the background image region to classify pixels as foreground pixels or background pixels. The foreground pixels are then classified based on predetermined characteristics. The background image region may then be updated to include foreground pixels that did not have the predetermined characteristics. The systems and methods allow for searching for background updates to thereby determine when a change has occurred in the area-of-interest.

17 Claims, 6 Drawing Sheets

U.S. PATENT DOCUMENTS

| | | | |
|---|---|---|---|
| 5,734,737 A | 3/1998 | Chang et al. | 382/107 |
| 5,745,126 A | 4/1998 | Jain et al. | 345/952 |
| 5,862,508 A * | 1/1999 | Nagaya et al. | 701/207 |
| 5,920,338 A | 7/1999 | Katz | 348/150 |
| 5,956,081 A | 9/1999 | Katz et al. | 348/163 |
| 5,969,755 A | 10/1999 | Courtney | 348/143 |
| 5,973,732 A | 10/1999 | Guthrie | 348/169 |
| 6,002,995 A | 12/1999 | Suzuki et al. | 702/188 |
| 6,028,626 A | 2/2000 | Aviv | 348/152 |
| 6,049,363 A | 4/2000 | Courtney et al. | 348/700 |
| 6,061,088 A | 5/2000 | Khosravi et al. | 348/169 |
| 6,069,655 A | 5/2000 | Seeley et al. | 348/154 |
| 6,075,560 A | 6/2000 | Katz | 348/150 |
| 6,097,429 A | 8/2000 | Seeley et al. | 348/154 |
| 6,185,314 B1 | 2/2001 | Crabtree et al. | 382/103 |
| 6,188,777 B1 | 2/2001 | Darrell et al. | 382/103 |
| 6,237,647 B1 | 5/2001 | Pong et al. | 141/94 |
| 6,285,746 B1 | 9/2001 | Duran et al. | 379/93.21 |
| 6,295,367 B1 | 9/2001 | Crabtree et al. | 382/103 |
| 6,359,647 B1 | 3/2002 | Sengupta et al. | 348/169 |
| 6,396,535 B1 | 5/2002 | Waters | 348/159 |
| 6,400,830 B1 | 6/2002 | Christian et al. | 382/103 |
| 6,400,831 B2 | 6/2002 | Lee et al. | 382/103 |
| 6,437,819 B1 | 8/2002 | Loveland | 348/143 |
| 6,442,476 B1 | 8/2002 | Poropat | 701/207 |
| 6,456,320 B2 | 9/2002 | Kuwano et al. | 348/143 |
| 6,456,730 B1 | 9/2002 | Taniguchi | 382/107 |
| 6,483,935 B1 | 11/2002 | Rostami et al. | 382/141 |
| 6,502,082 B1 | 12/2002 | Toyama et al. | 706/16 |
| 6,516,090 B1 | 2/2003 | Lennon et al. | 382/173 |
| 6,522,787 B1 | 2/2003 | Kumar et al. | 382/268 |
| 6,526,156 B1 | 2/2003 | Black et al. | 382/103 |
| 6,549,643 B1 | 4/2003 | Toklu et al. | 382/107 |
| 6,549,660 B1 | 4/2003 | Lipson et al. | 382/224 |
| 6,574,353 B1 | 6/2003 | Schoepflin et al. | 382/103 |
| 6,580,821 B1 | 6/2003 | Roy | 382/154 |
| 6,591,005 B1 | 7/2003 | Gallagher | 382/154 |
| 6,658,136 B1 * | 12/2003 | Brumitt | 382/103 |
| 6,661,918 B1 * | 12/2003 | Gordon et al. | 382/173 |
| 6,678,413 B1 * | 1/2004 | Liang et al. | 382/181 |
| 6,698,021 B1 | 2/2004 | Amini et al. | 725/105 |
| 6,791,603 B2 | 9/2004 | Lazo et al. | 348/169 |
| 6,798,445 B1 | 9/2004 | Brummitt et al. | 348/207.11 |
| 6,798,909 B2 * | 9/2004 | Miyatake et al. | 382/190 |
| 6,813,372 B2 | 11/2004 | Stanbridge et al. | 382/107 |
| 7,110,569 B2 * | 9/2006 | Brodsky et al. | 382/103 |
| 2001/0032118 A1 | 10/2001 | Carter | 705/11 |
| 2002/0030739 A1 * | 3/2002 | Nagaya et al. | 348/143 |
| 2003/0025800 A1 | 2/2003 | Hunter et al. | 348/208.13 |
| 2003/0040815 A1 | 2/2003 | Pavlidis | 700/48 |
| 2003/0053658 A1 | 3/2003 | Pavlidis | 382/103 |
| 2003/0058111 A1 | 3/2003 | Lee et al. | 340/573.1 |
| 2003/0058237 A1 | 3/2003 | Lee | 345/418 |
| 2003/0058341 A1 | 3/2003 | Brodsky et al. | 348/169 |
| 2003/0058342 A1 | 3/2003 | Trajkovic | 348/207.1 |
| 2003/0071891 A1 | 4/2003 | Geng | 348/39 |
| 2003/0103139 A1 | 6/2003 | Pretzer et al. | 348/143 |
| 2003/0123703 A1 | 7/2003 | Pavlidis et al. | 382/103 |
| 2003/0197612 A1 | 10/2003 | Tanaka et al. | 340/572.1 |
| 2004/0001612 A1 * | 1/2004 | Gutta et al. | 382/107 |
| 2004/0130620 A1 | 7/2004 | Buehler et al. | 348/143 |
| 2004/0155960 A1 | 8/2004 | Wren et al. | 348/150 |
| 2004/0160317 A1 | 8/2004 | McKeown et al. | 340/522 |
| 2004/0164858 A1 | 8/2004 | Lin | 340/522 |
| 2004/0252197 A1 | 12/2004 | Fraley et al. | 348/207.1 |
| 2005/0017071 A1 | 1/2005 | Noonan | 235/385 |
| 2005/0073418 A1 | 4/2005 | Kelliher et al. | 340/572.1 |
| 2005/0078006 A1 | 4/2005 | Hutchins et al. | 340/561 |
| 2005/0102183 A1 | 5/2005 | Kelliher et al. | 705/16 |

FOREIGN PATENT DOCUMENTS

| | | |
|---|---|---|
| EP | 0 714 081 A1 | 5/1996 |
| EP | 0 967 584 A2 | 12/1999 |
| EP | 1189187 A2 | 3/2002 |
| JP | 8011071 | 1/1996 |
| WO | 97/04428 | 2/1997 |
| WO | 01/82626 A1 | 11/2001 |

OTHER PUBLICATIONS

Li, et al "Adaptive Video Background Replacement", IEEE, pp. 385-388, 2001.*

Chang et al., "Tracking Multiple People with a Multi-Camera System," *IEEE*, 19-26 (2001).

International Search Report for International Application No. PCT/US03/35943 dated Apr. 13, 2004.

Khan et al., "Human Tracking in Multiple Cameras," *IEEE*, 331-336 (2001).

International Search Report for PCT/US04/033168 dated Feb. 25, 2005.

Written Opinion of the Internation Searching Authority for PCT/US04/033168 dated Feb. 25, 2005.

International Search Report for PCT/US04/29418 dated Feb. 28, 2005.

Written Opinion of the Internation Searching Authority for PCT/US04/29418 dated Feb. 25, 2005.

International Search Report for PCT/US04/29417 dated Mar. 18, 2005.

Written Opinion of the International Searching Authority for PCT/US04/29417.

International Search Report for PCT/US2004//033177 dated Dec. 12, 2005.

Written Opinion for PCT/US2004/033177.

International Preliminary Report on Patentability for PCT/US2004/029417 dated Mar. 13, 2006.

International Preliminary Report on Patentability for PCT/US2004/033177 dated Apr. 10, 2006.

International Preliminary Report on Patentability for PCT/US2004/033168 dated Apr. 10, 2006.

* cited by examiner

SYSTEM AND METHOD FOR SEARCHING FOR CHANGES IN SURVEILLANCE VIDEO

BACKGROUND OF THE INVENTION

1. Field of the Invention

The present invention generally relates to video surveillance, and more specifically to improved systems and methods for searching for changes in an area-of-interest (AOI).

2. Brief Description of the Prior Art

The current heightened sense of security and declining cost of camera equipment have resulted in increased use of closed circuit television (CCTV) surveillance systems. Such systems have the potential to reduce crime, prevent accidents, and generally increase security in a wide variety of environments.

A simple closed-circuit television system uses a single camera connected to a display device. More complex systems can have multiple cameras and/or multiple displays. One known type of system is the security display in a retail store, which switches periodically between different cameras to provide different views of the store. Higher security installations, such as prisons and military installations, use a bank of video displays each displaying the output of an associated camera. A guard or human attendant constantly watches the various screens looking for suspicious activity.

More recently, inexpensive digital cameras have become popular for security and other applications. In addition, it is now possible to use a web cam to monitor a remote location. Web cams typically have relatively slow frame rates, but are sufficient for some security applications. Inexpensive cameras that transmit signals wirelessly to remotely located computers or other displays are also used to provide video surveillance.

As the number of cameras increases, the amount of raw information that needs to be processed and analyzed also increases. Computer technology can be used to alleviate this raw data processing task, resulting in a new breed of information technology device—the computer-aided surveillance (CAS) system. Computer-aided surveillance technology has been developed for various applications. For example, the military has used computer-aided image processing to provide automated targeting and other assistance to fighter pilots and other personnel. In addition, computer-aided surveillance has been applied to monitor activity in swimming pools. CAS systems may be used to monitor a particular AOI if, for instance, the AOI includes a particularly valuable object.

CAS systems typically operate on individual video frames. In general, a video frame depicts an image of a scene in which people and things move and interact. Each video frame is composed of a plurality of pixels which are often arranged in a grid-like fashion. The number of pixels in a video frame depends on several factors including the resolution of the camera, and the display, the capacity of the storage device on which the video frames are stored. Analysis of a video frame can be conducted either at the pixel level or at the (pixel) group level depending on the processing capability and the desired level of precision. A pixel or group of pixels being analyzed is referred to herein as an "image region".

Image regions can be categorized as depicting part of the background of the scene o depicting a foreground object. In general, the background remains relatively static in each video frame. However, objects may be depicted in different image regions in different frames. Several methods for separating objects in a video frame from the background of the frame, referred to as object extraction, are known in the art. A common approach is to use a technique called "background subtraction." Of course, other techniques can be used as well.

Current surveillance systems provide a rudimentary techniques for performing area change searches. Such a system may allow a user to specify a specific AOI within the video frame in which to search for a change. The system then searches through each video frame and measures the number of changed pixels within the AOI. If the number of changed pixels within the AOI in a particular frame surpasses a specified percentage, then that frame is returned as a positive result in the search. This approach may be referred to as frame-by-frame differencing.

Frame-by-frame differencing, however, has a number of drawbacks. In particular, it may return too many false positive results. These false positive results could be due to obstructions moving in front of the AOI. For example, if a user is interested in searching for the moment when a laptop that was sitting on a desk was stolen, then using this search technique will return all instances when a person walks in front of the desk and occludes the laptop from view (assuming of course that the number of pixels that changed due to the person walking in front of the desk exceeds the specified percentage). In most cases, the person subsequently moves away from the desk and reveals the un-stolen laptop, at which point the search has returned a false positive.

Another approach is to utilize background subtraction to perform the analysis. In a typical background subtraction algorithm, foreground pixels are separated from background pixels by subtracting a video frame from a "background image." This background image is periodically updated with new data in order to track slow changes to the background (e.g., lighting changes). Typically the background update is performed by averaging newly classified background pixels with the existing background image. Foreground pixels are not averaged with the background to prevent "pollution" of the background image. In this way, the background image adapts to slow or small color changes, and all fast or large color changes are considered foreground. As it is, however, this simple background subtraction algorithm offers little advantage over the frame-by-frame differencing technique described above. That is, it may still provide false positives for searches related to the AOI. This is due to the way in which the search would be conducted in a system utilizing this technique would proceed. In particular, in searches performed on systems utilizing simple background subtraction, the search for changes in the AOI would return all instances where a pixel changes and that change is not a small or slow change (i.e., the pixel would be classified as a foreground pixel). This may return, however, all instances when, for example, a person walks in front of the AOI but all of these occurrences may not be of interest.

SUMMARY OF THE INVENTION

Various embodiments of the systems and methods described herein solve the above mentioned problems as well as others. In particular, some embodiments may improve on the above approaches by reducing the number of false positives that may occur in a search for changes in an AOI. In some embodiments, instead of using frame-by-frame differencing or simple background subtraction, a modified background subtraction algorithm is used to determine when an important change in the AOI has occurred (i.e., when a particular object has been stolen). The basic idea is not to return all changes to the AOI, but to only return changes to the background in the AOI. The intuition is that in most cases, the object-of-interest within the AOI can be considered a background (i.e., stationary) object. Foreground objects (e.g., people and other moving things) might temporarily occlude the object-of-interest, but only when the actual object-of-interest disappears should the background reflect the change.

In one embodiment, a computerized method of determining when a change has occurred in an area-of-interest included in an image region is disclosed. The embodiment may include steps of: initializing a background image region of at least a portion first frame; comparing a first image region from a second frame to the background image region to classify pixels as foreground pixels or background pixels; classifying foreground pixels based on predetermined characteristics; and updating the background image region to include at least one foreground pixel that does not embody the predetermined characteristics.

One aspect of this embodiment may include a step of recording when the background image region was updated. In particular, this aspect may include saving in a database the location of the second frame.

In another aspect of this embodiment, the method may also include a step of searching the recorded video to determine when the background image was updated. This aspect may include a step of determining whether all areas-of-interest have been processed.

In another aspect, the step of updating the background may include incorporating the at least one pixel into the background and the step of searching may include a step of determining the number pixels that were incorporated into the background that are within the area-of-interest. This aspect may further include a step of comparing the number pixels that were incorporated into the background that are within the area-or-interest with a threshold to determine if the threshold is exceed. This aspect may also include a step of returning a positive search result if the threshold is exceeded. In addition, this aspect may also include a further step of backtracking to a frame where the pixels that were incorporated into the background were first classified as foreground pixels.

Another aspect of this embodiment may include classifying the foreground pixels based on a static property. In this aspect, the static property may be at least one of color, size, texture, or shape.

In another aspect of this embodiment, foreground pixels may be classified based on a dynamic property. In this aspect, the dynamic property may be at least one of velocity, acceleration, change in size, change in area, change in color, or lack of motion.

In yet another aspect of this embodiment, the step of updating the background image includes a step of incorporating the at least one foreground pixel that does not embody the predetermined characteristics into the background image. This aspect may include overwriting the at least one foreground pixel onto the background image.

In another embodiment, a computerized method of searching video information to determine when a change has occurred in an area-of-interest is disclosed. The method of this embodiment may include steps of: classifying foreground pixels into a first type and a second type; incorporating the foreground pixels of the first type into a background image; recording, as a background update occurrence, when the foreground pixels of the first type were incorporated into the background in a database; and searching the database for background update occurrences.

BRIEF DESCRIPTION OF THE DRAWINGS

The foregoing discussion will be understood more readily from the following detailed description of the invention, when taken in conjunction with the accompanying drawings. In the drawings.

DETAILED DESCRIPTION

In general, the present system and methods disclosed herein allow for automated examination of surveillance video to detect moments when an AOI changes. In one embodiment, the system and methods may mark specific frames in "real-time" video when it is determined that the background in an AOI has changed. The same systems and methods may be employed on recorded video as well. In such cases, a search function may be used on the recorded video to detect when changes to the AOI have occurred. Detecting such changes in an AOI may allow a user to determine, for example, when a high value item was stolen, when an object falls onto a floor, when a door is closed, when a car parks in a parking space, or any change to a region of video that occurs suddenly and remains changed for a period of time. Regardless of the scenario, the systems and method disclosed herein may accomplish their examination by implementing a specially modified background subtraction algorithm. General background subtraction and the specially modified background subtraction are described in greater detail below.

The systems and methods disclosed herein may be implemented in a computer-assisted surveillance system (CAS). In a typical surveillance system, cameras capture image data that depicts the interaction of people and things in a monitored environment. Types of cameras include analog video cameras, digital video cameras, or any device that can generate image data. The word "camera," is used as a generic term that encompasses any sensor that can output video data. In one embodiment, the CAS system observes a monitored environment through a number of input sensors although its primary sources of information are video cameras. The majority of CCTV installations use common visible-light video cameras. In such installations, the CAS system employs advanced video analysis algorithms for the extraction of information from analog NTSC or PAL video. These algorithms, however, are not limited to the visible light spectrum; they can also be applied to infrared video or even imagery from radar or sonar installations if available.

Figure 1:
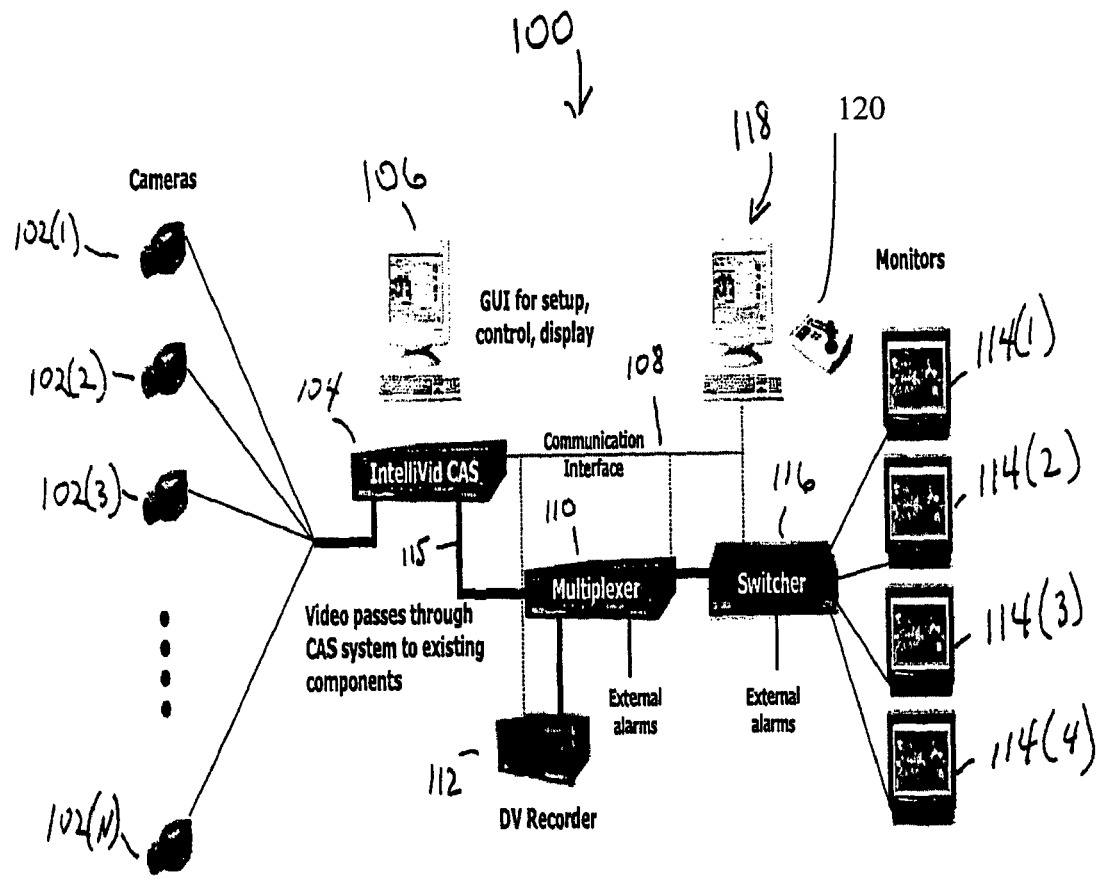
FIG. 1 is a block diagram of an illustrative overall computer-assisted surveillance ("CAS") system utilizing one aspect of the invention.

FIG. 1 shows an illustrative ("CAS") system 100 that may be used to perform aspects of the present invention. Of course, other CAS systems may be used and the specific system set forth in FIG. 1 is an example of only one such system. The plurality of cameras or other image input devices 102 provide image inputs to a CAS computer 104 programmed to provide image analysis. CAS computer 104 can include a display 106 providing a graphical user interface for setup, control and display. CAS computer 104 can also include one or more user input devices (not shown) such as keyboards, mice, etc. to allow users to input control signals.

CAS computer 104 may perform advanced image processing including image feature extraction, background subtraction (general as well as the specifically modified algorithm taught herein), dynamic classification and tracking. CAS computer 104 can automatically detect objects and activity and can generate warning and other information that can be transmitted over a digital communications network or other interface 108. CAS computer 104 also uses interface 108 to retrieve data, such as previously recorded video stored on recorder 112 or information stored on other computers. CAS computer 104 provides the outputs of the various cameras 102 to a multiplexer 110 for recording, typically continuous or stop-frame, by recorder 112 and for display on one or more displays 114 via a switcher 116. An additional user interface (e.g., provided by another computer 118 and user input including, for example, a joystick 120) can be used to allow an operator to control switcher 116 to select images to view and to control other parts of system 100 including CAS computer 104. Mutiplexer 110 and/or switcher 116 can respond to external alarms that occur when certain types of activity have been automatically detected (e.g., an alarm generated by a motion sensor) and record or display video appropriately. These alarms can also be generated by CAS computer 104 based on detected activities in the video streams such as when a specific AOI changes.

The illustrative CAS Computer 104 system integrates seamlessly into any existing security infrastructure. The illustrative embodiment CAS system 100 is compatible with, for example, legacy analog video sources, in addition to newer digital video sources such as USB, FireWire, or IP cameras on wired or wireless networks. The CAS computer 104 may, in some embodiments, act as a passive repeater of its input signals, so that in the event of a CAS computer 104 failure, the remainder of the security infrastructure may continue to function.

While video cameras 102 are typically the primary sensors for the CAS system 100, the system can also accommodate other commonly-used sensors, such as motion detectors, smoke detectors, spill detectors, microphones, point-of-sale (POS) recordings, electronic article surveillance (EAS) systems, and access control systems. The illustrative CAS system 100 combines information from these sensors with the video analysis results to provide an even richer description of activities in the world. For example, POS information may be used with video images to verify that a customer purchased a particular product.

Figure 2:
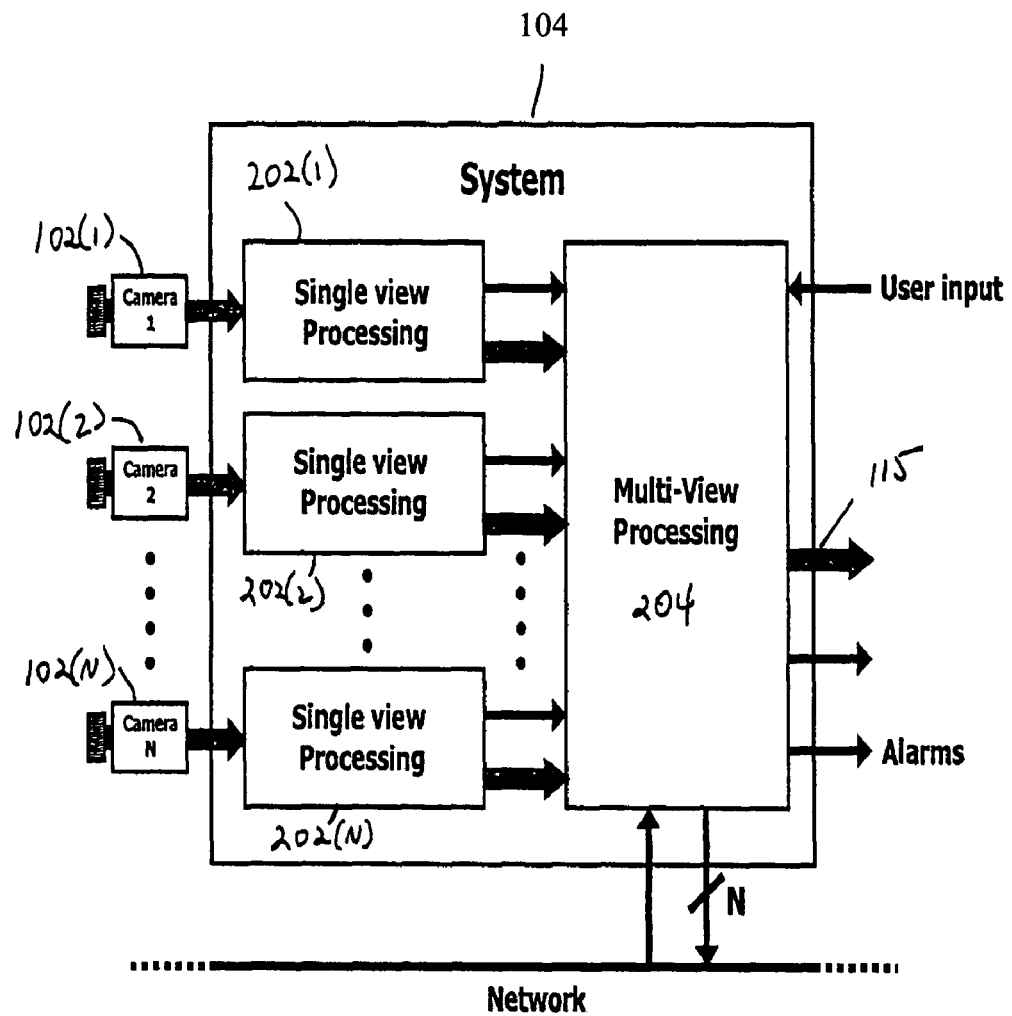
FIG. 2 is a high-level block diagram of an illustrative CAS computer according to one embodiment of the invention.

FIG. 2 shows a high-level block diagram of an illustrative CAS computer 104. For illustrative purposes, the computer components are grouped into two main classes: single-view processing blocks 202 (SVPs) and multi-view processing blocks 204 (MVPs). Each image input source is attached to a SVP 202. Image input sources include cameras 102 as well as a variety of storage devices including, for example, computer disks, VHS tapes, and digital videotapes. For purposes of data analysis, image data outputted by a video storage device is the equivalent of image data generated by a camera. Each SVP 202 typically performs video processing tasks that require only a single video stream. The outputs of the SVP 202 are connected to a MVP 204 that processes multiple video streams at once. Depending on the embodiment, a processing module includes a MVP 204, or a combination of one or more SVPs 202 and one or more MVPs 204. The CAS computer also includes memory modules (not shown) for receiving and storing incoming image data. The memory modules can be a part of the processing module, or they can be separate from the processing module.

The single-view processing components 202 and the multi-view processing components 204 typically analyze data as a series of video frames depicting a scene. In one embodiment, image data is analyzed directly from a camera. In another embodiment, the analyzed image data can originate from a storage device. Some cameras and video storage devices create and store image data on a frame-by-frame basis. Other storage systems, such as database, may only store video frame updates, i.e. detected changes to the scene. To carry out analysis of image data, the CAS computer 104 constructs a video frame from stored image data that may be stored in a variety of devices and formats.

Figure 3:
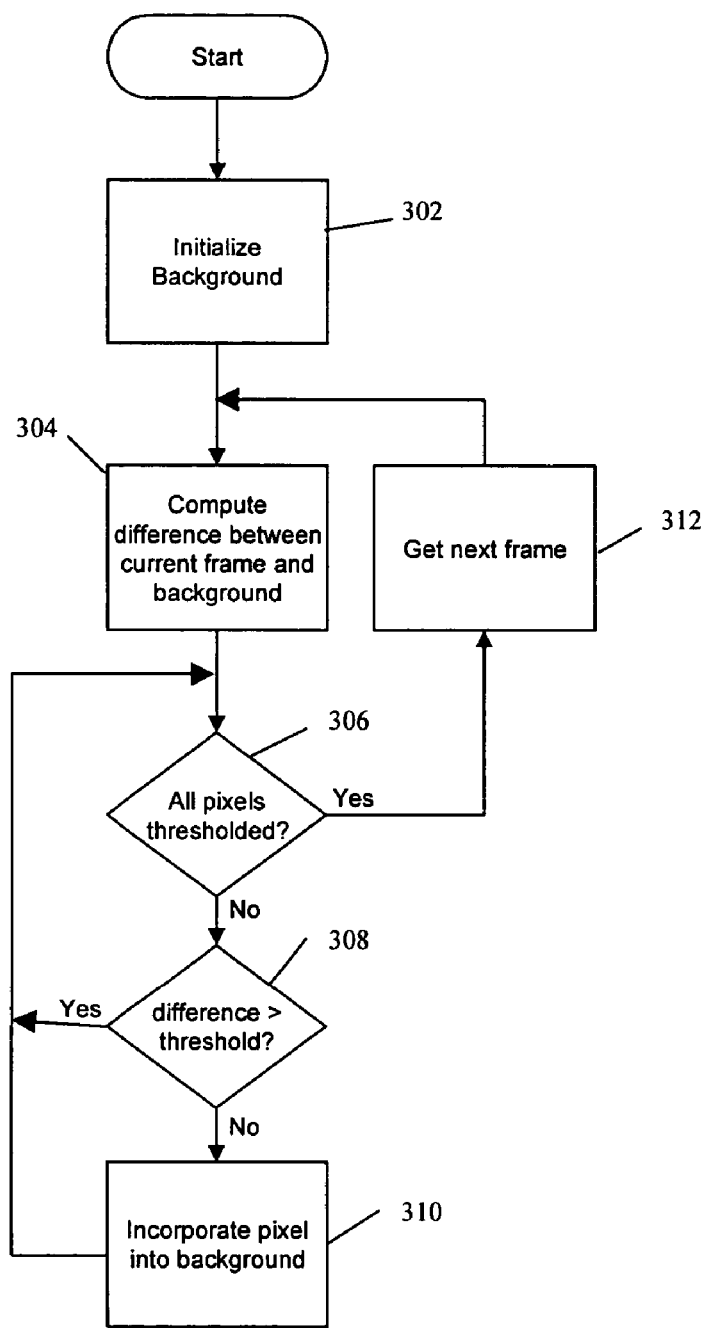
FIG. 3 is a flowchart of detailing one possible background subtraction process.

Referring now to FIG. 3, a so called simple background subtraction method is shown in flow-chart form. This method may be used to classify, in the first instance, whether pixels are background pixels or foreground pixels.

The process starts at step 302 where the background frame is initialized. Initialization of the background may occur, for instance, by recording at least 1 frame that includes the AOI. In some embodiments, this may include recording the intensity, color or characteristics of each pixel. After the background frame has been initialized a subsequent frame is compared with the it in step 304. Of course, this process could be utilized so that every frame is not analyzed and, for instance, every nth frame is compared to the background frame. The difference comparison between the current frame and the background, in some embodiments, may include comparing each of the corresponding pixels in the current frame to the background frame. The following description assumes that the entire frame is being analyzed but, as will be readily understood, only a portion of the frame needs to be analyzed. Thus, the process could be readily modified to perform properly in such a situation. Regardless, the result of the comparison represents the difference in the "pixel level" between corresponding pixels. Then, at decision step 306, it is determined whether all pixels have been thresholded (i.e. whether the entire frame or image region has been compared to the background frame or portion thereof or otherwise analyzed). If the entire frame or image region has not been analyzed then it is determined at decision block 308 whether the difference between each of the pixels is greater than the threshold. If the difference is not greater than the threshold then the particular pixel may be incorporated into the background at step 310. Incorporating of a pixel into the background allows the background to be constantly updated to reflect the status of the current scene. Incorporation of a pixel into the background may be accomplished by, for example, averaging the newly classified background pixels with the existing background image or by other methods known in the art. If, however, the difference is greater than the threshold, the pixel is classified as a foreground pixel and is not incorporated into the background.

Returning now back to decision block 306, if all of the pixels have been thresholded then the method gets a new frame or image region at step 312 and the process of computing the differences between the current frame/image region and the background frame is repeated. This general process, however, may have some shortcomings in that any pixel that has a difference that is greater than the threshold is considered foreground. Searching for foreground pixels to determine when a change occurs may result in too many false positives. For instance, a system may be monitoring whether a particularly valuable piece of artwork hanging on a wall has been removed. The artwork, because it is staying still, or is part of the initial background frame, is considered background. Of course, such a piece of artwork may have people walk in front of it thus occluding the view the camera has of the artwork. The person stepping in front of the artwork may cause the method of FIG. 3 to determine that the artwork has become foreground (i.e., several pixels in the location where the artwork is located changed a significant amount). However, when the person move away, the background will return to normal but the system will have already determined that the artwork was gone (i.e., the pixels become foreground). Any search performed that seeks to find when AOI foreground will, thus, return a false positive for every time a person walked in front of the artwork.

Figure 4:
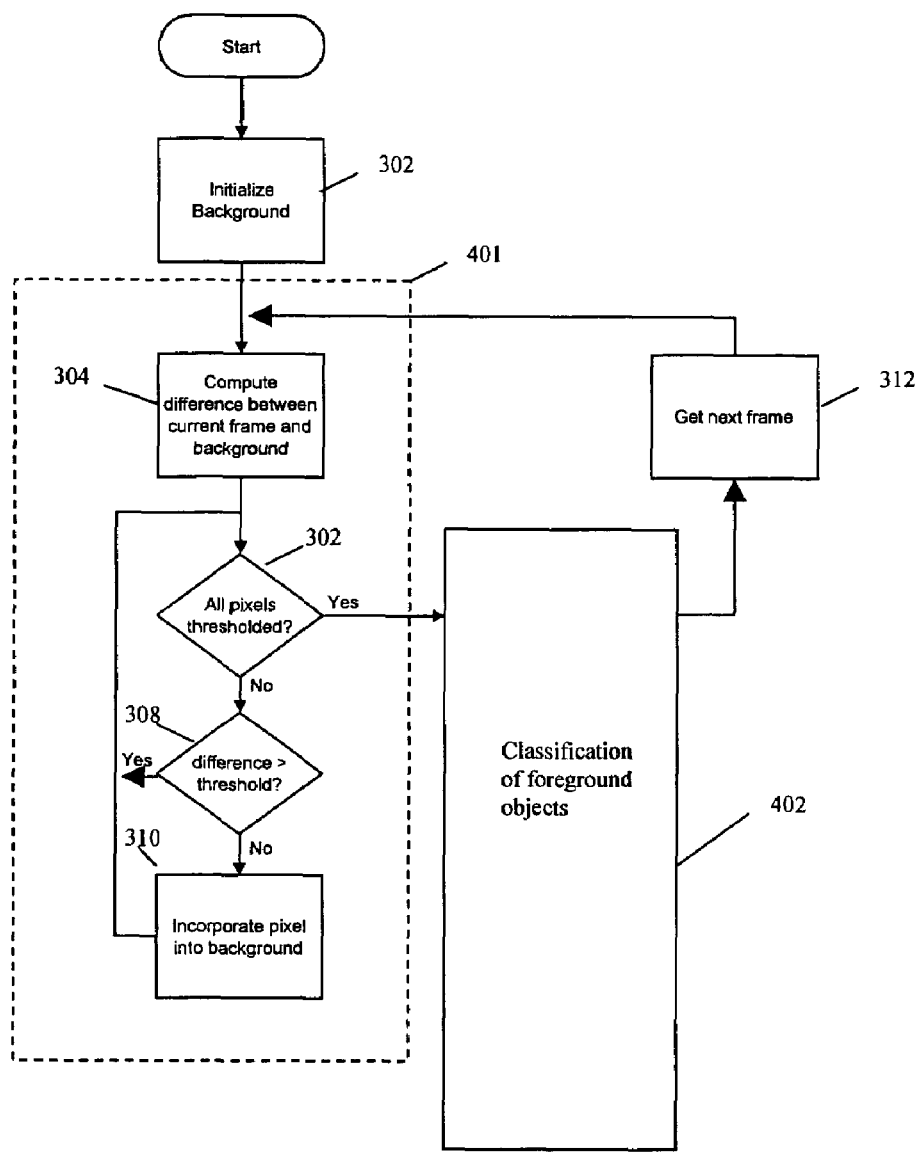
FIG. 4 is a flowchart showing a modified background subtraction process.

FIG. 4 is similar to FIG. 3 but, due to the addition of a step 402, may alleviate some of the problems identified above with respect to simple background subtraction disclosed in FIG. 3.

In particular, step 402 is a further classification of foreground pixels. Rather than the simple determination of whether the difference between a current pixel and a background pixel is greater than the threshold determining whether a change in a frame or image region is in the foreground or the background, process step 402 further classifies foreground pixels. In particular, after pixels are classified as foreground or background (using the traditional background subtraction method) they are passed into higher level processing step 402 to determine whether the foreground pixel is "interesting" or not.

The dashed box 401 in FIG. 4 includes all of the steps shown in FIG. 3. This dashed box 401 shall be referred to as a general background subtraction block and may be thought of as a process for comparing a first frame to a background frame to determine which portions of the frame are foreground and which are background. As shown, the background subtraction block 401 includes all of the steps shown in FIG. 3. It should be understood, however, that any background subtraction method or other method that allows for the division of a frame or image region into foreground objects and background will suffice. It should be understood, in addition, that the get next frames step 312 is not required for determining the difference between foreground objects and background. Rather that this step merely keeps the process in FIG. 3 going. Therefore, block 312 is not included in block 401 as shown in FIG. 4. After the frame has been separated into foreground objects and background, those foreground objects are further classified in step 402. As will be described in greater detail below, this classification process can determine whether or not certain pixel groups that have been classified as foreground pixels are "interesting". If pixel groups are considered interesting, then those groups are not incorporated into the background. As also will be discussed further below, when an object is incorporated into background, that occurrence is recorded and may be further searched. In some embodiments, the recording of a background update may also be used to trigger an alarm or some other notification.

Figure 5:
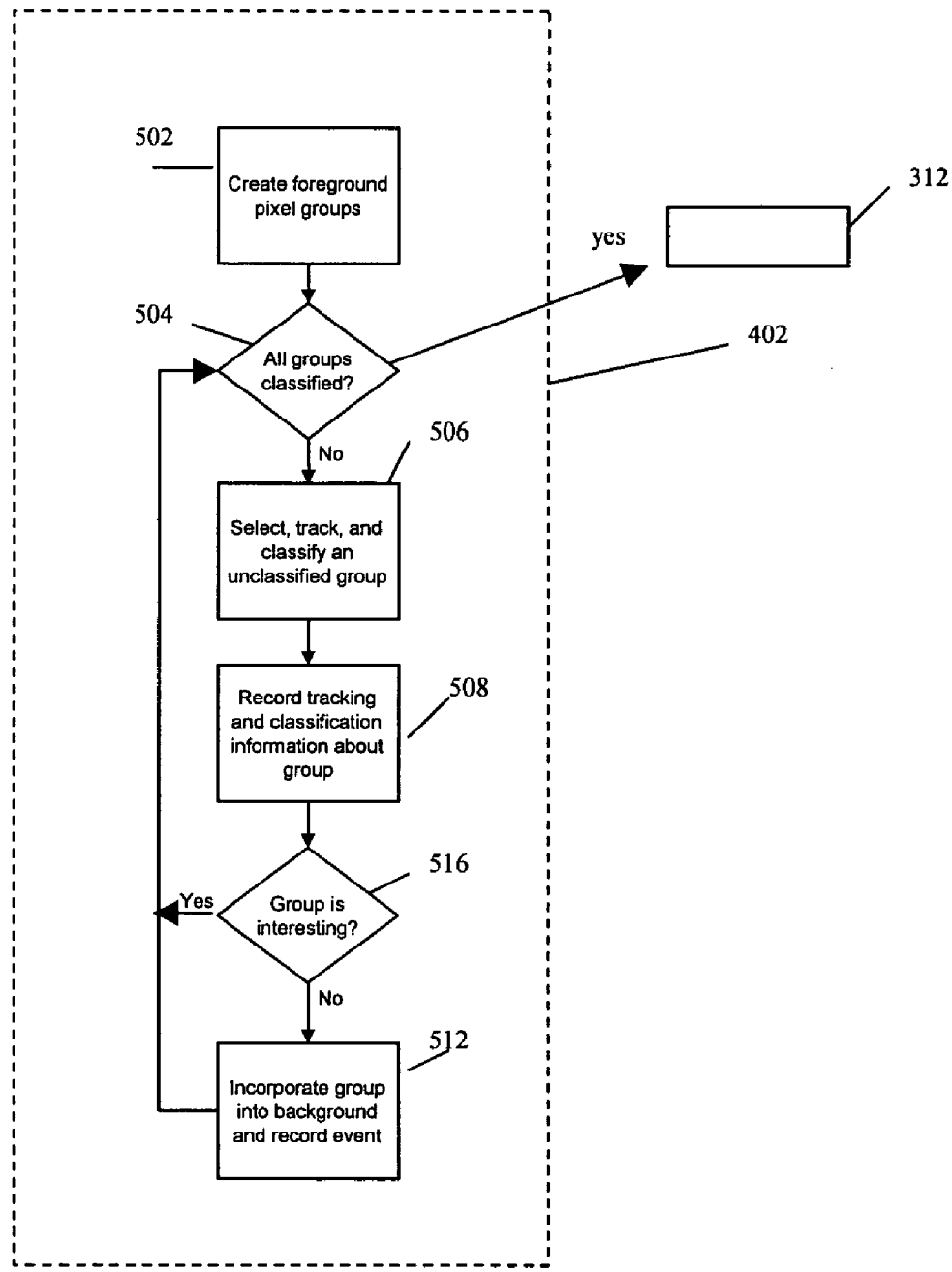
FIG. 5 is a flowchart further expanding on one portion of the flowchart shown in FIG. 4.

FIG. 5 shows a more detailed version of the classification of foreground objects step 402 shown in FIG. 4. The input to this step are the results of the background subtraction process previously carried out and discussed above. In particular, this input includes the pixels that are considered foreground pixels. At step 502, the foreground pixels are linked together with neighboring foreground pixels to form coherent groups. Methods of linking the foreground pixels into such coherent groups are well known in the art. Of course, the pixels need not necessarily be linked into coherent groups but such linking may reduce computation required. As such, the remainder of FIG. 5 assumes that the foreground pixels have been linked but is by way of illustration only.

The next step, step 504, determines whether all groups are classified. Of course, this step could be omitted if only one group is present or the user wishes to only classify one group (classification is discussed later). After the groups have been created (step 502) and there are still groups to process (optional step 504), a first group is selected, tracked and classified at step 506. Of course, if there is only group, there is no selection needed in step 506.

The tracking and classifying groups performed in step 506 may be done in many different manners and both are known in the art.

In one embodiment, the classification conducted on a group of pixels at step 506 may be of two different types: static classification and dynamic classification. As described in more detail below, the end result of both types of classification is the determination of whether a group of pixels is "interesting" or not. Uninteresting groups of pixels are then incorporated into the background frame or background image region, which allows the background to adapt to large changes that are deemed uninteresting by the higher-level classification routine. Interesting groups of pixels can be passed on to other processing stages for further processing.

Static classification refers to a classification procedure that operates on a group of pixels from a single instant in time (i.e., from a single frame of video). This type of classification uses instantaneous properties of the pixel group, such as, for example, size, color, texture, or shape to determine if the group of pixels is interesting or not. For example, a group of pixels may be considered uninteresting if it is too small (e.g., video noise) or too large (e.g., accidental camera motion). It should be understood that the particular properties and threshold used to classify may vary depending on the specific environment in which the system is operating. This is also true for dynamic classification.

Dynamic classification refers to classification rules that examine a pixel group over a period of time to make a classification. In order to accomplish this style of classification, some sort of pixel group tracking process may be required. There are many tracking algorithms in the prior art and any will suffice—all that is required is a correspondence of pixel groups over a period of time.

Examples of dynamic classification properties include velocity, acceleration, change in size, change in area, change in color, lack of motion, or any property that includes some time dependence. These properties, and others, may be considered predetermined characteristics of the foreground pixels that are later used to determine whether or not the pixel group is interesting. For example, a system may decide that a group of pixels is uninteresting if it has not moved or changed appearance in a certain period of time (e.g., 2 seconds).

One way in which to make the interesting/uninteresting distinction is to utilize a multi-pass classification model. As discussed above, any classifier may be used in the present invention. A particularly useful classifier may operate as described below. The classifier may include a first pass classifier that is used to remove noisy pixels and other artifacts or external variables. A second pass classifier is used in correlation with the output of a tracker. This interaction includes but is not limited to any combination of spatial, temporal, image feature, and motion output from a tracking system. This classification of objects may be applied on a per frame basis. In more detail, the first pass classifier is used to filter out any pixel groups in an image which are visibly noise or remnants and determines, therefore that those pixel groups are not interesting. This basically is similar to a more conventional noise classifier approach. The classifier then relies on the tracker to creates a matching between every remaining pixel group and a certain object for each video frame. The second pass classifier then looks at the data from the tracker and compares it with data from other frames. Characteristics of followed objects are analyzed along with a state history of that particular object. In some embodiments, the classifier may keep an active memory of how a given object (now correlated to pixel group) was created. If that particular object has been seen on this or another camera in the past, all of its history is remembered. If an object is new, very little is known about it so any decisions the classifier makes will have a lower probability of correctness than an object that has been tracked for several frames. In some embodiments, various predetermined characteristics of the pixel group may help in the classification process. This example may include, for example: Motion information (has the object moved and, if so, how fast?); Grouping information; and Appearance/Signature information.

Returning now to FIG. 5, the results of the classification may then, at step 508, be recorded for later use. However, this step is not required and may be omitted in some embodiments. After recordation (if it is performed), the next step 510 determines whether the group is interesting. Interesting groups, as described above may be considered in pixels that represent live objects or a moving object that has left the screen, etc. If the group is not interesting it is incorporated into the background at step 512. The incorporation of a group into the background may be accomplished simply by copying the new pixels over the top of the old ones present in background frame or background image region. Since these types of changes tend to be larger, averaging the differences tends to be less effective. Like the tracking and classification information, the fact that a group of pixels has been incorporated into the background may also recorded, at step 512, for future reference. The incorporation of pixels into the background represents a frame where the frame has changed (i.e., an item was stolen) where the frame change is not due to motion introduced by, for example, a person walking in front of the AOI.

Regardless of whether the group was determined to be interesting (step 516) or the group was incorporated into the background (step 512), control is then returned to decision step 504 which continues this process until all groups have been classified. After all groups have been classified control is returned to, for instance, step 312 (FIG. 3).

The above disclosure details a specific manners in which background updates may be accomplished. As discussed above, it may be beneficial to have an alarm or other event triggered when a background is updated. There may exist, however, a further need to search recorded video to determine when certain activities occurred in the AOI. One method of searching is disclosed below.

Figure 6:
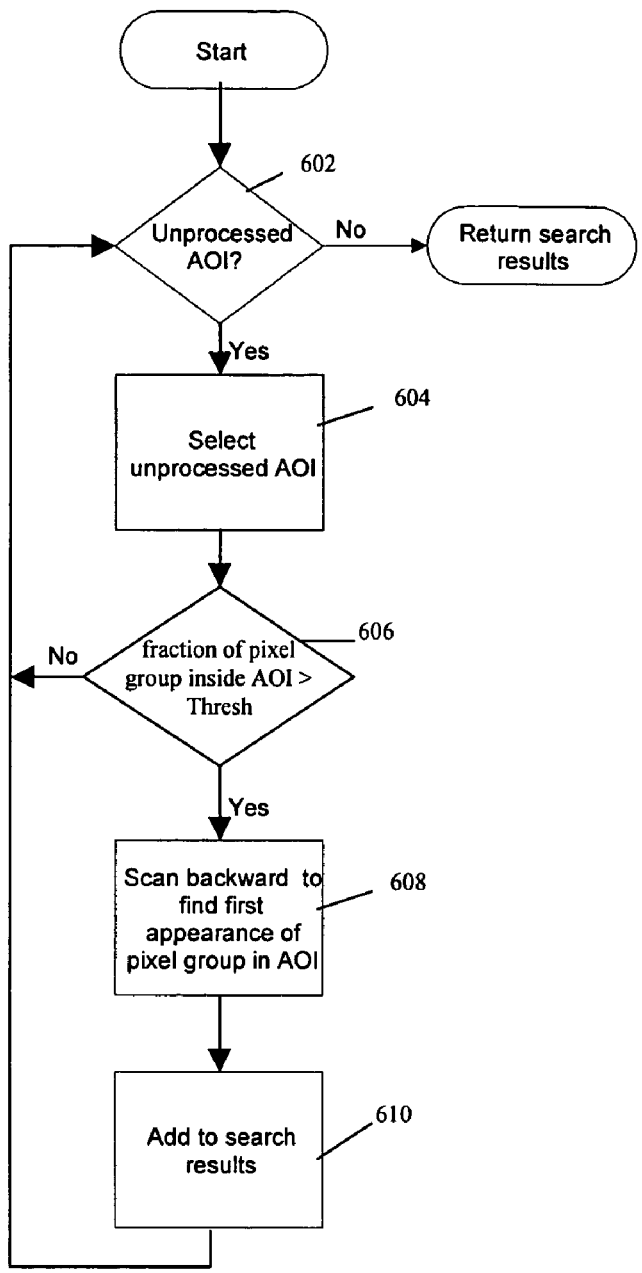
FIG. 6 is a flowchart showing one possible search method that may be employed according to an aspect of the invention.

FIG. 6 is high level flow chart of a search process that may be used to search for changes in the AOI. The process starts at step 602 where it is determined whether there are any AOI's that still need to be searched. If so, one of those AOI's to still be searched may be selected in step 604. The search method that is shown in FIG. 6 may progress until every AOI has been searched as indicated by step 602. It should be remembered that the search is looking for instances where the background has been updated. The fact that the background has been updated indicates that something initially classified as foreground has been determined to be uninteresting (i.e., it is probably not a time where a person occluded the view). At step 604, an AOI that has not yet been process is selected. The search, at step 606, then compares each pixel group that was incorporated into the background (step 512, FIG. 5) with the AOI. If a specified fraction of an incorporated pixel group lies inside an AOI (e.g., 100% implies the groups is totally inside the AOI), then that pixel group should be returned as a positive search result at step 610.

Note that the frame at which the group is incorporated may not correspond to the most relevant frame that should be returned for the search result, since some dynamic classifiers may take a while to make a decision. The stored tracking information, if available, can be used to "backtrack" to a more relevant position at optional step 608. For example, if an object appears in an AOI at frame 100, and become incorporated into the background at frame 110, then the search result should return frame 100 if possible.

Such searches are also useful for pre-recorded video (as opposed to live video). Since the background update information has been stored, for instance, in a database, there is no need to reprocess video that is archived. The minimal information that is stored is just the location and time at which an object was incorporated into the background model. When a AOI has been defined for a recorded video, positive search results can be found by scanning through the recorded background update occurrences.

One skilled in the art will realize the invention may be embodied in other specific forms without departing from the spirit or essential characteristics thereof. For instance, the description above has focused on methods that may be implemented in software. Of course, these methods could be implemented in hardware, firmware, software or any combination thereof. The foregoing embodiments are therefore to be considered in all respects illustrative rather than limiting of the invention and the scope of the invention is not limited to just the foregoing description.

What is claimed is:

1. A computerized method of determining when a change has occurred in an area-of-interest included in an image region of a series of video frames, the method comprising steps of:

initializing at least a portion of the image region as a background image region;

receiving a first video frame including pixels not included in th background image region;

classifying the pixels as foreground pixels;

based on subsequently received frames, updating the background image region to include at least one of the pixels previously classified as a foreground pixel; and in response receiving a request from a user to identify the time at which the background image region was updated, presenting and the first video frame to the user.

2. The method of claim 1, further comprising a step of recording when the background image region was updated.

3. The method of claim 2, wherein the step of recording includes saving in a database the location of the second frame.

4. The method of claim 2, further comprising a step of searching the recorded video to determine when the background image was updated.

5. The method of claim 4, wherein the step of searching includes a step of determining whether all areas-of-interest have been processed.

6. The method of claim 4 wherein the step of searching includes a step of determining the number pixels that were incorporated into the background in the step of updating the background that are within the area-or-interest.

7. The method of claim 6, further comprising a step of comparing the number pixels that were incorporated into the background in the step of updating the background that are within the area-or-interest with a threshold to determine if a threshold is exceed.

8. The method of claim 7, further comprising a step of returning a positive search result if the threshold is exceeded.

9. The method of claim 7, further comprising a step of backtracking to a frame where the pixels that were incorporated into the background were first classified as foreground pixels.

10. The method of claim 1, wherein the step of classifying includes a step of classifying the foreground pixels based on a static property.

11. The method of claim 10, wherein the static property is at least one of color, size, texture, or shape.

12. The method of claim 1, wherein the step of classifying includes a step of classifying the foreground pixels based on a dynamic property.

13. The method of claim 12, wherein the dynamic property is at least one of velocity, acceleration, change in size, change in area, change in color, or lack of motion.

14. The method of claim 1, wherein the step of updating the background image includes a step of incorporating the at least one foreground pixel that does not embody the predetermined characteristics into the background image.

15. The method of claim 14, wherein the step of incorporating includes overwriting the at least one foreground pixel onto the background image.

16. A computerized method of searching video information to determine when a change has occurred in an area-of-interest comprising the steps of:

classifying pixels within a first video frame as foreground pixels;

incorporating the foreground pixels into a background image after tracking the pixels for a series of frames;

recording, as a background update occurrence, when the foreground pixels were incorporated into the background in a database; and in response to a request from a user for the background update occurrence, searching the database for background update occurrences, backtracking to the first video frame and presenting the first video frame to the user.

17. The method claim 16, further comprising a step of classifying pixels as foreground pixels or background pixels.

* * * * *